Jan. 5, 1954     J. H. JACOBS ET AL     2,664,925
PORTABLE POWER SAW WITH OPPOSITELY ROTATING BLADES
Filed April 16, 1949     2 Sheets-Sheet 1
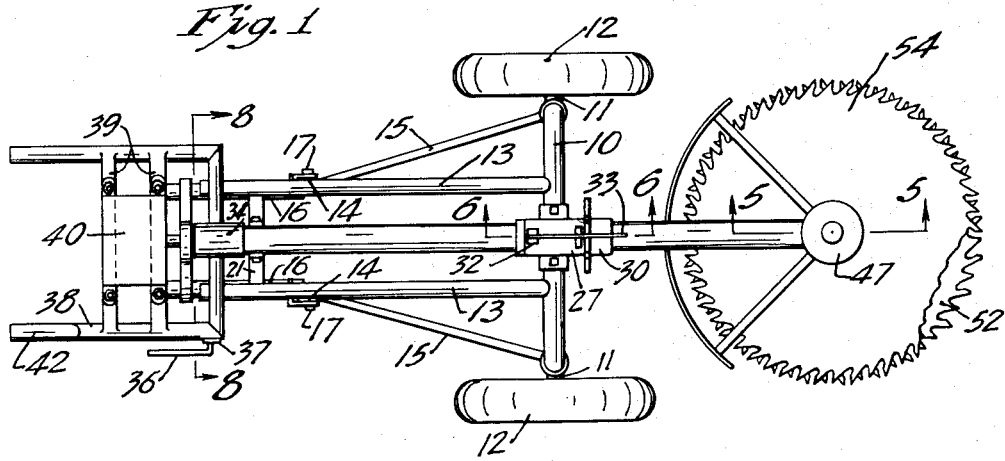
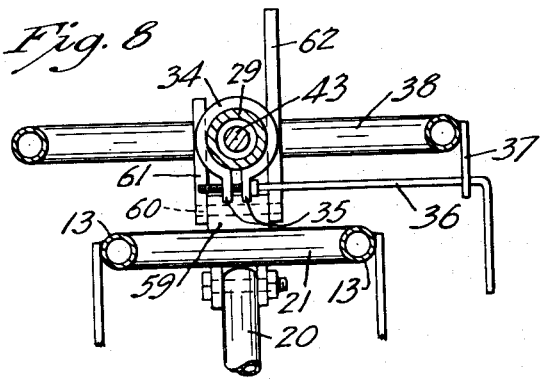
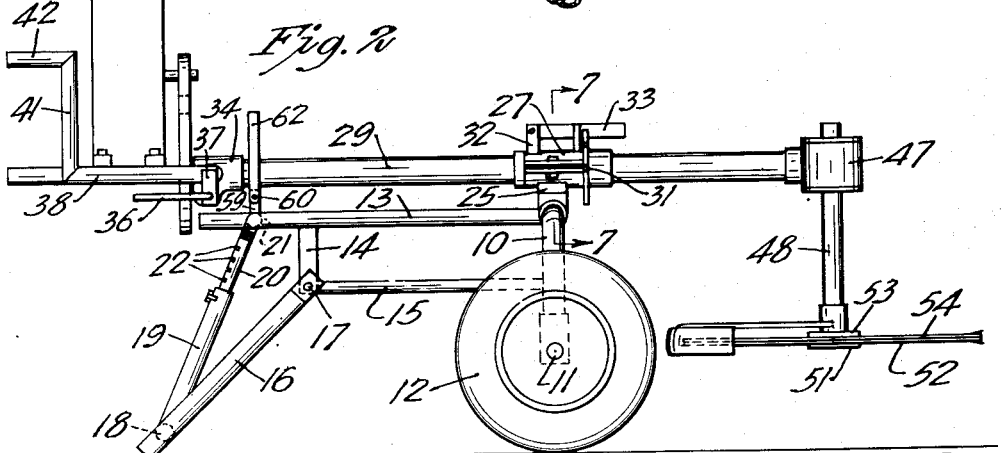
Inventors
Joseph H. Jacobs
Marcellus L. Jacobs
By Williamson & Williamson
Attorney Jan. 5, 1954   J. H. JACOBS ET AL   2,664,925
PORTABLE POWER SAW WITH OPPOSITELY ROTATING BLADES
Filed April 16, 1949   2 Sheets-Sheet 2

Inventors
Joseph H. Jacobs
Marcellus L. Jacobs
By Williamson & Williamson
Attorneys Patented Jan. 5, 1954

2,664,925

UNITED STATES PATENT OFFICE 2,664,925

PORTABLE POWER SAW WITH OPPOSITELY ROTATING BLADES

Joseph H. Jacobs and Marcellus L. Jacobs, Minneapolis, Minn.

Application April 16, 1949, Serial No. 87,892

6 Claims. (Cl. 143—43)

This invention relates to a power saw and more particularly to that type which is mounted on a wheeled frame or carriage and supports a power driven circular saw for cutting standing or felled timber.

It is an object of the invention to provide a power saw which includes a pair of closely spaced oppositely rotating blades one of which will neutralize the drag of the other so that there is no torque transmitted to the wheeled frame as the saw cuts into a piece of timber or the like.

Another object of the invention is to provide a saw including a wheel supported frame wherein the saw assembly can be shifted from the horizontal cutting position to a vertical cutting position and releasably secured in those positions through convenient and effective means.

Another object of the invention is to provide a saw including a power shaft housing having a saw assembly on one end and a motor at the other end and wherein the saw head or blade unit can be swung to different positions relative to the frame while the motor is maintained at an approximately upright position independently of movement of the saw head or blade unit.

Another object of the invention is to provide means for holding the saw assembly against movement relative to the frame so that it can be conveniently transported and also to provide means whereby the level or angle of the frame and the saw blade unit can be varied as desired.

The above and other objects and advantages of the invention will more fully appear from the following description made in connection with the accompanying drawings, wherein like reference characters refer to the same parts throughout the views, and, in which:

Figure 1 is a plan view of an embodiment of the invention;

Figure 2 is a side elevational view thereof;

Figure 8 is an enlarged section taken approximately on the line 8—8 of Figure 1.

Figure 3:
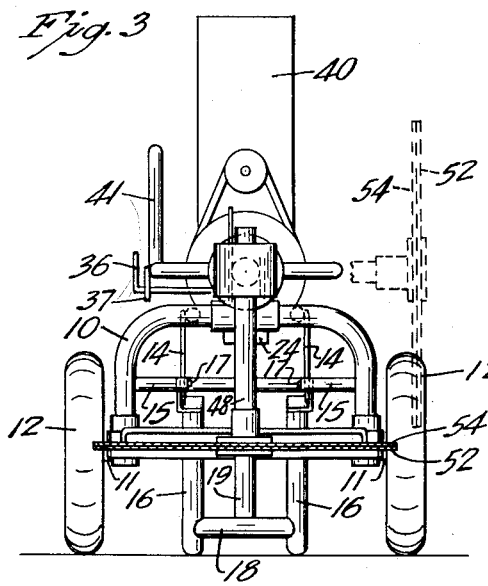
Figure 3 is a front end elevation.
Figure 4:
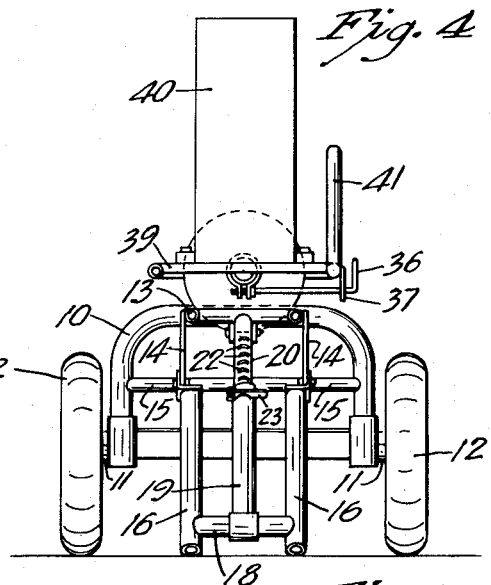
Figure 4 is a rear end elevation.

The under carriage of the apparatus includes a cross frame or axle member 10 having stub axles 11 upon which wheels 12 are mounted. Extending rearwardly from the cross frame 10 are longitudinal frame members 13. Extending downwardly from each frame member is a vertical strap 14 and a radius bar 15 connects each strap with respective end portions of the cross frame 10.

Extending downwardly from the straps 14 are legs 16 which are pivotally connected to the straps by pins 17. The legs 16 are connected at their lower ends by a cross member 18. Extending upwardly from said cross member is a jack sleeve 19 which has a jack post 20 slidably mounted therein. The upper end of the post 20 is connected to a cross member 21 which extends between rear portions of the longitudinal frame members 13, as shown in Figure 2.

The post 20 is provided with a plurality of notches 22, and the upper end of the jack sleeve 19 pivotally supports a small locking bar 23 which can be swung into and out of engagement with the notches 22 to support the post 20 at various vertically adjusted positions and thereby to change the angle of the entire frame assembly relative to the ground.

Mounted on the upper central portion of the cross frame member 10 is a block 24. A second block 25 rests upon the block 24 and has a pivot pin 26 which extends downwardly through the block 24 and through the cross frame 10. The block 25 comprises the lower half of a bearing, the upper half being in the form of a cap 27 which is connected to the block 25 by means of studs 28.

A drive shaft housing 29 of tubular shape extends through the bearing members 25 and 27 and is rotatable therein. A flanged collar 30 is mounted on the drive shaft housing 29 for rotation therewith and it is provided with notches 31. The bearing cap 27 has a pair of fork arms 32 extending upwardly therefrom. Between them a catch arm 33 is pivoted and this arm can be swung into and out of the notches 31 on the flanged collar 30 which is secured to the tubular housing 29 to releasably secure said housing against rotation and to hold it in various positions relative to the bearing assembly 25, 27.

Mounted on the rear end of the housing 29 is a split sleeve 34 having ears 35 which can be drawn together by a rod 36 having an inner threaded end which passes through the ears 35. The rod 36 extends laterally outwardly from the housing 29 and its outer end is supported by a bracket 37 secured to a motor support frame member 38 which is best shown in Figure 1 as being connected to the split sleeve 34.

The motor support member 38 is roughly of U-shape and has a pair of cross members 39 upon which a motor 40 is mounted. One side of the motor frame or support 38 is extended upwardly as at 41 and thence rearwardly as at 42 to provide a control handle which will be mentioned further below.

Figure 5:
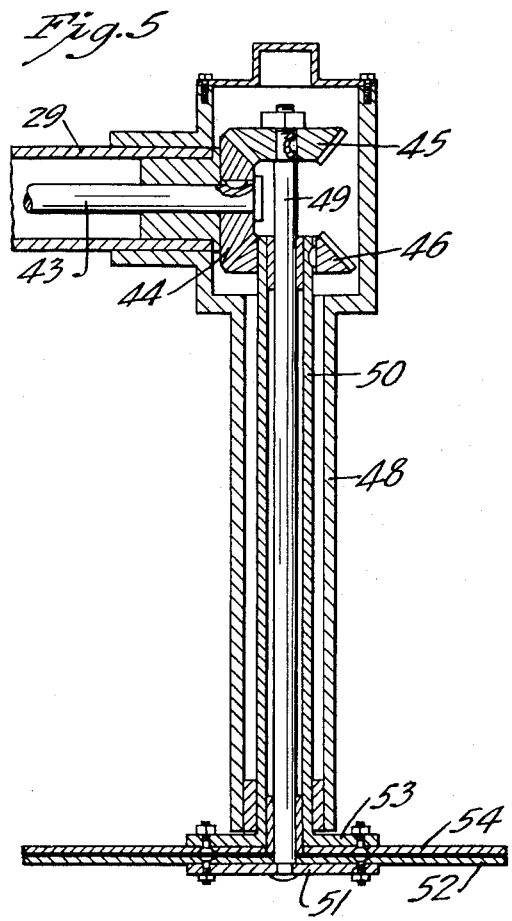
Figure 5 is an enlarged fragmentary section taken on the line 5—5 of Figure 1.
Figure 6:
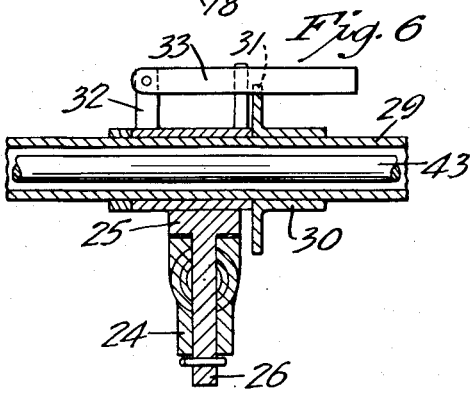
Figure 6 is an enlarged section taken approximately on the line 6—6 of Figure 1.

Connected to the motor 40 and extending through the drive shaft housing 29 is a drive shaft 43. As shown in Figure 5, the forward end of the shaft 43 is provided with a bevel gear 44 which meshes with a pair of bevel gears 45 and 46, the latter two gears being diametrically opposite on the gear 44. The gears 44 through 46 lie in a housing 47. A tubular housing extension 48 extends radially from the forward end of the housing 29. A shaft 49 is connected to the bevel gear 45 and a tubular shaft 50 is connected to the bevel gear 46 and lies outwardly concentric to the shaft 49. The latter shaft extends through the bevel gear 45 and is rotatable relative thereto.

The shaft 49 is provided with an end plate 51 which supports a circular saw blade 52. The tubular shaft 50 is provided with an end flange 53 to which is connected a circular saw blade 54. The blade 52 is provided with a series of straight teeth 55 and a plurality of angularly set teeth 56. The blade 54 is provided with straight teeth 57 and angularly set teeth 58. It will be noted in Figure 5 that the blades 52 and 54 lie very close to each other and that their angular teeth 56 and 58 respectively are angled outwardly in opposite directions.

The rear frame cross member 21 has a block 59 mounted thereon, as shown in Figures 2 and 8. Extending through the block is a pin 60 on the ends of which are upwardly extending arms 61 and 62, the latter arm being longer than the former. When the arm 62 is swung to a vertical position and the arm 61 moves with it, the drive shaft housing 29 can be held between the arms 61 and 62 to prevent said housing and the saw assembly and motor from swinging about the pivot pin 26. When the arms 61 and 62 are dropped this assembly can then be swung relative to the wheeled frame of the apparatus. When the saw is operated it will be seen that the blades 52 and 54 will rotate in opposite directions by reason of the arrangement of the beveled gears 45 and 46. As the blades cut into a piece of wood the drag of one blade will offset the drag of the other, and there is no tendency of the saw to pull as is the case with a single blade. Some of the teeth are set at angles so that the blade will not bind when cutting through a thick piece of wood, and they are set outwardly in opposite directions on the two blades, as stated above, in order that the blades may be placed closely together. They can be located in approximate contact. It has been found through the operation of an actual machine that sawdust will not gather between the blades by reason of the centrifugal action set up by the rotating blades. Because of the oppositely rotation and closely set blades a thick log can be sawed without pulling the machine on its wheeled support, and it has also been found that the saw can be set at a vertical position and caused to cut down through a stack of small pieces of wood without throwing them about because of the equalized drag in opposite directions. It is practically impossible to cut a stack of small wood with a single bladed power operated saw unless the wood is bound into a bundle.

Figure 7:
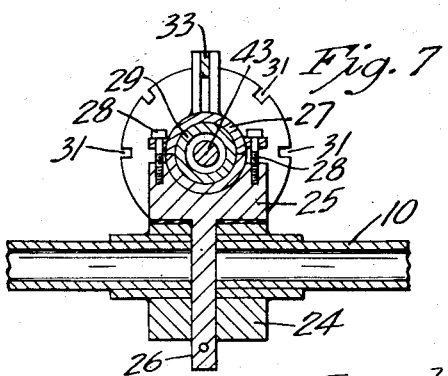
Figure 7 is an enlarged section taken approximately on the line 7—7 of Figure 2.

It should be noted that some of the notches 31 in the flanged collar 30 are at locations other than horizontal or vertical. As indicated in Fig. 7, two notches lie at angles of approximately 45° from the perpendicular. It is contemplated that additional notches be provided at other intermediate points, thereby enabling the saw blades to be set to corresponding angular positions. This is important for the reason that the ground is often not level adjacent a tree to be cut and this adjustment permits proper leveling of the saw to provide convenient cutting.

Swinging of the saw blades from the horizontal position shown in Fig. 3 to the dotted line position thereof is accomplished by releasing the catch 33 and swinging the entire drive assembly including its drive means and drive shaft housing 29. When the blades have been moved to a vertical position the catch 33 is again engaged and the saw will be held in that position.

It is preferred that the motor 40 be a small internal combustion engine. Because of this it is not possible to have the motor rotate with the drive shaft housing 29 when the blades are swung as described. When the blades are thus shifted the threaded rod 36 is manipulated to release or separate the ears 35 on the split sleeve 34 at the rear end of the housing, and the motor is temporarily held by hand in an upright position while the saw and its drive shaft housing are rotated. Then the split sleeve 34 is again tightened so that the motor will remain in an upright position.

The crank shaped handle structure 41, 42 at the rear portion of the motor support 38, 39 is provided to permit convenient swinging of the saw assembly about its pivot pin 26 during certain cutting actions such as cutting through a standing tree.

The motor 40 and the forward end of the saw assembly are in an approximate balanced condition so that when the saw blades are in a vertical plane the entire apparatus can be tilted about the stub axles 11 when cutting vertically through a log or a stack of small pieces of wood.

The jack assembly 19, 20, of course, is designed to level the wheeled frame and the power shaft and its housing 29 for horizontal cutting as illustrated in Fig. 2.

It will, of course, be understood that various changes may be made in the form, details, arrangement and proportions of the various parts without departing from the scope of our invention.

What we claim is:

1. A mobile, power saw for cutting standing or felled timber brush and other growth, having in combination a frame having ground-engaging supporting means for travel over the ground, an elongated power transmitting mounting pivotally supported on said frame for free oscillation thereon relative to said ground-engaging supporting means on substantially a vertical axis, said elongated mounting extending substantially beyond the forward end of said frame and said ground-engaging, supporting means, a pair of rotary, disc, saw blades supported for revolution on a common axis from the outer end of said elongated mounting and positioned closely adjacent each other, a motor having driving connections with said saw blades to drive the two in opposite directions, whereby said elongated mounting may be swung on said pivot to facilitate horizontal cutting of timber without transmission of torque to said frame and without applying drag or torque to the timber cut.

2. A mobile power saw according to claim 1 wherein said saw blades have teeth thereon formed to cut in opposite directions, certain of the saw teeth of each of said blades being angularly extended from the general plane of its blade and in a direction away from the other blade.

3. A mobile, power saw for cutting standing or felled timber brush and other growth, having in combination a frame tiltable on a horizontal axis and having ground-engaging supporting means for travel over the ground, an elongated power transmitting mounting supported on said frame and mounted for free oscillation on said frame relative to said ground-engaging supporting means on a substantially vertical pivot, said elongated mounting extending substantially forwardly of said ground-engaging supporting means, a pair of rotary, disc, saw blades positioned closely adjacent eath other and supported for rotation on a common axis from one end of said elongated mounting, means for selectively retaining said mounting in one of a plurality of oscillated relations to its longitudinal axis, a motor mounted upon the other end portion of said mounting so as to provide for substantial counterbalance, and driving connections supported from said elongated mounting and connected with said saw blades to drive the same in opposite directions, whereby said elongated mounting may be swung on said substantially vertical pivot to facilitate cutting of timber without transmission of torque to said frame as the saw cuts and whereby said frame may be tilted in substantially a vertical plane to facilitate vertical movements of the saw without imparting torque or interference upon said frame or the material sawed.

4. A mobile, power saw for cutting standing or felled timber brush and other growth, having in combination a frame tiltable on a horizontal transverse axis and having ground-engaging supporting means for travel over the ground, an elongated power shaft housing pivotally supported by said frame and mounted for free oscillation thereon relative to said ground-engaging supporting means upon a substantially vertical axis and extending substantially beyond the forward end of said frame, a pair of cooperating rotary, disc, saw blades concentrically mounted in closely adjacent relation at the outer end of said housing and disposed in offset relation to the axis of said housing, means for retaining said housing in a plurality of oscillated positions about its axis and relative to said frame to provide at least for horizontal cutting and vertical cutting, a drive shaft mounted longitudinally within said housing connected at its outer end with said saws to revolve the same in opposite directions, whereby said mounting and the saw unit at the outer end thereof may be freely swung on a substantially vertical axis to facilitate horizontal cutting of timber without transmission of torque or drag to said frame or the material cut and whereby said frame may be tilted in substantially a vertical plane to similarly facilitate vertical cutting by the saw unit.

5. A mobile, power saw for cutting standing or felled timber having in combination, a frame mounted upon a pair of wheels which are axially aligned on an axis transverse of said frame, an elongated power transmitting mounting pivotally supported on said frame for free oscillation thereon on substantially a vertical axis and extending substantially beyond the forward end of said frame and said wheels, a rotary saw unit supported from the outer end of said elongated mounting, said unit comprising a pair of rotary, disk saw blades supported for rotation on a common axis, a motor supported from the rear portion of said mounting and driving connections from said motor to said saw unit supported from said mounting and driving said disc blades in opposite directions, and a jack leg construction extending downwardly and rearwardly from the rear end of said frame for adjustably positioning the tilted angle of said frame on the axis of said wheels and for bracing said frame against rearward displacement thereof, said jack leg construction with said wheels and frame providing a tripod support on which the power transmitting mounting is oscillatably supported.

6. A mobile power saw for cutting standing or felled timber having in combination a frame freely tiltable upon a horizontal, transverse axis and mounted upon a pair of wheels which are axially aligned, an elongated power shaft housing supported by said frame and extending substantially beyond the forward end of said frame and beyond said wheels, a cradle at the forward portion of said frame disposed medially above said wheels for supporting the medial portion of said elongated power shaft housing, a pivot pin for connecting said housing with said cradle with freedom of oscillation of said housing upon said frame in substantially a horizontal plane, a pair of cooperating rotary, disc saw blades concentrically mounted in closely adjacent positions from the outer end of said housing and disposed in offset relation to the axis of said housing, means for retaining said housing in a plurality of angular positions, rotated upon the longitudinal axis of said housing to provide at least for horizontal and vertical cutting, a drive shaft mounted longitudinally within said housing and connected at its outer end with said saws to revolve the same in opposite directions, whereby said mounting or housing and the saw unit at the outer end thereof may be freely swung on a horizontal axis as well as upon a vertical axis involving said pivot pin to facilitate cutting of timber without transmission of torque or drag to said frame or the material cut.

JOSEPH H. JACOBS.
MARCELLUS L. JACOBS.

References Cited in the file of this patent

UNITED STATES PATENTS

| Number | Name | Date |
|---|---|---|
| 963,520 | Costello | July 5, 1910 |
| 2,461,188 | Stoner | Feb. 8, 1949 |
| 2,497,639 | Underwood | Feb. 14, 1950 |
| 2,555,428 | Tuttle | June 5, 1951 |

FOREIGN PATENTS

| Number | Country | Date |
|---|---|---|
| 118,817 | Australia | Aug. 14, 1944 |
| 487,366 | France | Apr. 4, 1918 |
| 497,900 | France | Sept. 30, 1919 |
| 624,231 | France | July 11, 1927 |